(12) United States Patent
Hampson et al.

(10) Patent No.: US 8,177,424 B2
(45) Date of Patent: May 15, 2012

(54) FIBER OPTIC SENSOR FOR USE ON SUB-SEA PIPELINES

(75) Inventors: Roger Hampson, Wokingham (GB); Kevin Williams, Eastleigh (GB); Andrew P. Strong, Romsey (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 475 days.

(21) Appl. No.: 12/306,274

(22) PCT Filed: Jun. 21, 2007

(86) PCT No.: PCT/GB2007/002290
§ 371 (c)(1),
(2), (4) Date: Apr. 29, 2009

(87) PCT Pub. No.: WO2008/001046
PCT Pub. Date: Jan. 3, 2008

(65) Prior Publication Data
US 2009/0279583 A1    Nov. 12, 2009

(30) Foreign Application Priority Data

Jun. 29, 2006 (GB) .................................... 0612868.0
Nov. 6, 2006 (GB) .................................... 0621998.4

(51) Int. Cl.
*G01K 3/00* (2006.01)
(52) U.S. Cl. .................. 374/131; 374/E3.001
(58) Field of Classification Search .................. 374/131, 374/136, 140, 147, 148, 161, 4, 7
See application file for complete search history.

(56) References Cited

U.S. PATENT DOCUMENTS

| 4,206,632 | A  | * | 6/1980 | Suzuki ............................. 374/4 |
| 6,217,211 | B1 | * | 4/2001 | Hesky ............................. 374/4 |
| 6,644,848 | B1 | * | 11/2003 | Clayton et al. ................... 374/7 |
| 6,647,350 | B1 | * | 11/2003 | Palfenier et al. ...... 374/E11.003 |

(Continued)

FOREIGN PATENT DOCUMENTS

EP    0170736 A1    2/1986

(Continued)

OTHER PUBLICATIONS

PCT/GB2007/002290—International Search Report dated Oct. 8, 2007.

*Primary Examiner* — Yaritza Guadalupe-McCall
(74) *Attorney, Agent, or Firm* — Brandon S. Clark (57) ABSTRACT

A fiber optic sensor assembly for use on a sub-sea pipeline. The fiber optic sensor assembly is coupled to remotely located equipment by fiber optic cable(s) which extend outside of the pipeline. The fiber optic sensor assembly is affixed to a mounting point on the pipeline. The mounting point is a pipe section having an internal conduit and at least one layer that surrounds the internal conduit for protection and insulation of the internal conduit. A segment of the pipe section has a portion of such layer(s) removed or omitted to define an annular recess. When installed, the assembly has two semi-cylindrical halves that are positioned with the annular recess and coupled together to thereby surround and embrace the segment of the pipe section. The assembly houses a length of optical fiber that is coupled to at least one externally accessible fiber optic connector.

37 Claims, 6 Drawing Sheets

U.S. PATENT DOCUMENTS

| | | | |
|---|---|---|---|
| 6,862,549 B1 * | 3/2005 | Palfenier et al. | 374/E11.003 |
| 6,945,692 B2 * | 9/2005 | Dammann | 374/161 |
| 6,960,019 B2 * | 11/2005 | Dammann | 374/161 |
| 7,240,730 B2 * | 7/2007 | Williams et al. | 374/137 |
| 2005/0000289 A1 | 1/2005 | Gysling et al. | |
| 2007/0024456 A1 * | 2/2007 | Currie | 340/584 |
| 2009/0279583 A1 * | 11/2009 | Hampson et al. | 374/131 |
| 2011/0058590 A1 * | 3/2011 | Hill | 374/161 |

FOREIGN PATENT DOCUMENTS

| | | |
|---|---|---|
| EP | 1635034 A1 | 3/2006 |
| EP | 1672344 A1 | 6/2006 |
| GB | 2111243 A | 6/1983 |
| GB | 2439558 A * | 1/2008 |
| WO | 0121479 A1 | 3/2001 |
| WO | WO 2008001046 A1 * | 1/2008 |

* cited by examiner

FIBER OPTIC SENSOR FOR USE ON SUB-SEA PIPELINES

BACKGROUND OF THE INVENTION

1. Field of the Invention

This invention relates to sub-sea pipelines carrying petroleum gas or an oil-gas mixture. More particularly, the invention relates to fiber optic sensors for use on sub-sea pipelines as well as methods for deploying the sensors.

2. Description of Related Art

Figure 1:
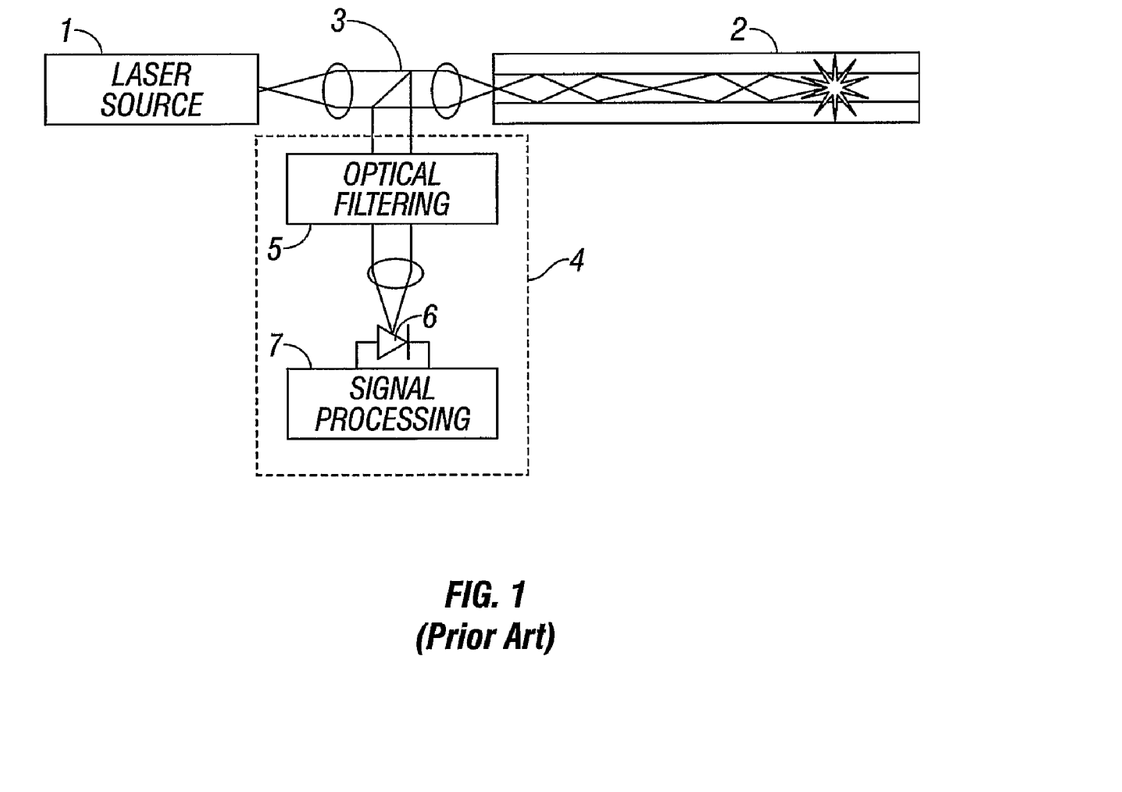
FIG. 1 is a schematic diagram of a prior art system for measuring temperature along a fiber optic waveguide.

It has been known for many years that fiber optic waveguides can be used to measure temperature. FIG. 1 schematically illustrates a system that employs a fiber optic waveguide to measure temperature. A pulsed-mode high power laser source 1 launches a pulse of light through a directional coupler 3 and along a fiber optic waveguide 2. The fiber optic waveguide 2 forms the temperature sensing element of the system and is deployed where the temperature is to be measured. As the pulse propagates along the fiber optic waveguide 2 its light is scattered through several mechanisms including density and composition fluctuations (Rayleigh scattering) as well as molecular and bulk vibrations (Raman and Brillouin scattering, respectively). Some of this scattered light is retained within the core of the fiber optic waveguide and is guided back towards the source 1. This returning signal is split off by the directional coupler 3 and sent to a receiver 4. In a uniform fiber, the intensity of the returned light shows an exponential decay with time (and reveals the distance the light traveled down the fiber optic waveguide based on the speed of light in the fiber optic waveguide). Variations in such factors as composition and temperature along the length of the fiber optic waveguide 2 show up in deviations from the "perfect" exponential decay of intensity with distance. The receiver 4 typically employs optical filtering 5 that extracts backscatter components from the returning signals. The backscatter components are detected by a detector 6. The detected signals are processed by the signal processing circuitry 7 which typically amplifies the detected signals and then converts (e.g. by a high speed analog-to-digital converter) the resultant signals into digital form. The digital signals may then be analyzed to generate a temperature profile along the length of the fiber optic waveguide 2. This type of temperature sensing is called distributed temperature sensing (DTS) because it measures a temperature profile along the length of a fiber optic waveguide.

Another type of fiber optic sensing is called point sensing. In point sensing, a Bragg grating is etched into a fiber optic waveguide at a desired location. The Bragg grating is designed to reflect light at a particular wavelength. Measurements of wavelength shift of the reflected light can be used to measure temperature or pressure or strain. Multipoint sensors have multiple spaced apart Bragg gratings, which are typically etched to reflect different wavelengths. Analysis of the wavelength shifts of the reflected light can sense conditions at multiple discrete locations along the fiber optic waveguide. Such "point sensing" functionality is described in detail in U.S. Pat. No. 6,097,487, herein incorporated by reference in its entirety.

A typical sub-sea pipeline is composed of a pipe surrounded by one or more layers of protective/insulating material, for example a steel pipe covered with a polymer sheath and then encased in concrete. For fiber optic sensing applications, optical fiber is placed between the pipe and the first layer of protective/insulating material. The sub-sea pipeline is assembled on a barge at sea from sections that are bolted and/or welded together. As sections of pipe are joined together, the ends of the optical fiber for the adjacent pipe sections must be joined to each other. Although such a sub-sea pipeline provides for fiber optic sensing, it suffers from several shortcomings, which include: (i) increased costs and difficulties in integrating the optical fiber as part of the pipeline sections; and ii) increased deployment times and costs as well as maintenance times and costs associated with ensuring the integrity and operation of the fiber optic couplings between section joints of the pipeline.

BRIEF SUMMARY OF THE INVENTION

It is therefore an object of the invention to provide a fiber optic sensor for a sub-sea pipeline.

It is another object of the invention to provide such a fiber optic sensor which can be used for temperature sensing as well as other sensing applications for a sub-sea pipeline.

It is also an object of the invention to provide such a fiber optic sensor which can be effectively and efficiently deployed and maintained in conjunction with deployment and maintenance of a sub-sea pipeline.

It is also an object of the invention to provide a fiber optic sensor which has an operational lifespan comparable to a sub-sea pipeline.

In accord with these objects, which will be discussed in detail below, the present invention provides a fiber optic sensor assembly (referred to below as a "sensor pad") that is mounted to a sub-sea pipeline. The sensor pad has two parts which are clamped together to form a generally annular structure which embraces a portion of the sub-sea pipeline. One of the two parts supports a housing that contains a length of a fiber optic waveguide encapsulated in a resin and terminating in at least one externally-accessible optical connector.

According to an illustrated embodiment, the sub-sea pipeline is made of sections that are joined together. The sections include an internal pipe (preferably made of steel) that is wrapped in one or more layers of protective/insulating material (e.g., an intermediate polypropylene layer and an outer layer of concrete). A portion of the protective/insulating material is removed or omitted for one or more predetermined pipeline sections to form an annular recess in such pipeline section(s). The annular recess provides an exposed area that is adapted to receive a sensor pad that is attached thereto. The housing of the sensor pad is operably disposed adjacent the exposed area such that the fiber optic waveguide disposed therein is in thermal contact with the internal pipe of the pipeline section.

Prior to attaching the sensor pad, two shrouds can be affixed (preferably by adhesive or by mechanical fixation such as an interference fit) to the opposed edges of the annular recess in the pipe section. The shrouds provide an environmental seal for the portions of the pipeline section exposed at the edges of the annular recess as well as an environmental seal between the exposed area of pipeline section and the contact area of the sensor pad. A first set of toroidal sealing rings are installed between the respective shrouds and the exposed outer diameter surface that defines the recess. A second set of toroidal sealing rings are installed between the shrouds and the contact surfaces of the sensor pad. For alternate embodiments where the shrouds are not used, the first set of sealing rings can be omitted and the second set of sealing rings can be installed between the contact surfaces of the sensor pad and the exposed outer diameter surface that defines the recess.

The sensor pads are coupled to remotely-located equipment by sub-sea certified fiber optic cables which run outside of and along the sub-sea pipeline. Some of the sensor pads can be coupled to one another in an in-line configuration by sub-sea certified fiber optic cables which run outside of and along the sub-sea pipeline. The sensor pads are provided with either wet-mate or dry-mate optical connectors and the cables are provided with a corresponding connector. Preferably, the sensor pads are attached to the pipeline at predetermined locations as the pipeline is being deployed from the construction barge. If dry-mate connectors are used, the cable is connected to the sensor pad prior to deploying it underwater. If wet-mate connectors are used, the cables are coupled to the sensor pads by divers or an ROV (remotely operated vehicle) after the pipeline is deployed. Above-water fiber connections can be made using standard fiber optic connectors.

The remote equipment preferably provides for distributed fiber optic temperature sensing measurements (FIG. 1) that provide an indication of the temperature in the vicinity of the sensor pads as well as at various locations along the fiber optic cable(s) extending between the sensor pad and remote equipment (and/or along fiber optic cable(s) extending between sensor pads). Because such fiber optic cable(s) extend along the exterior of the sub-sea pipeline, the temperature measurements for the locations along the fiber optic cable(s) provide for measurements of the ambient sea temperature along the fiber optic cable(s). Alternatively, the remote equipment can provide for fiber optic "point sensing" measurements that provide an indication of the temperature or pressure or strain in the vicinity of the sensor pads. The measurements of the remote equipment can be communicated to other systems for use in monitoring the sub-sea pipeline. The measurements can also be used to predict the formation of gas hydrates which can clog the pipeline. Alternatively, or in addition to such measurements, the remote equipment may be configured to detect pipeline leaks through the detection of vibrations or bubbles using known fiber optic noise detection techniques. Noise detection may also be used to detect the formation of hydrates.

Additional objects and advantages of the invention will become apparent to those skilled in the art upon reference to the detailed description taken in conjunction with the provided figures.

BRIEF DESCRIPTION OF THE DRAWINGS

FIGS. 7A-7D are schematic diagrams illustrating exemplary configurations for the optical fiber housed in the sensor apparatus of the present invention; FIG. 7A is suitable for spot temperature sensing as part of a fiber optic distributed sensing system; FIG. 7B is suitable for "point sensing" as part of a fiber optic point sensing system; FIG. 7C is suitable for in-line spot temperature sensing as part of a fiber optic distributed sensing system; and FIG. 7D is suitable for "multi-point sensing" as part of a fiber optic multiple-point sensing system.

DETAILED DESCRIPTION OF THE INVENTION

Figure 2:
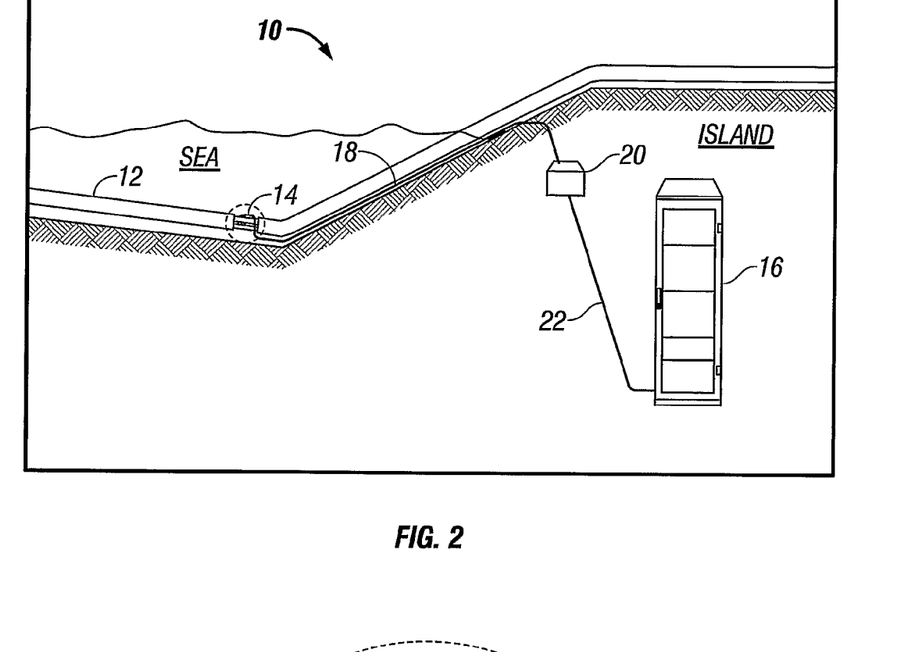
FIG. 2 is a schematic illustration of an exemplary fiber optic sensing apparatus according to the invention, which includes an assembly that is mounted to a sub-sea pipeline and that is coupled by a sub-sea fiber optic cable to remotely-located equipment (e.g., a system for fiber optic distributed temperature sensing).
Figure 2A:
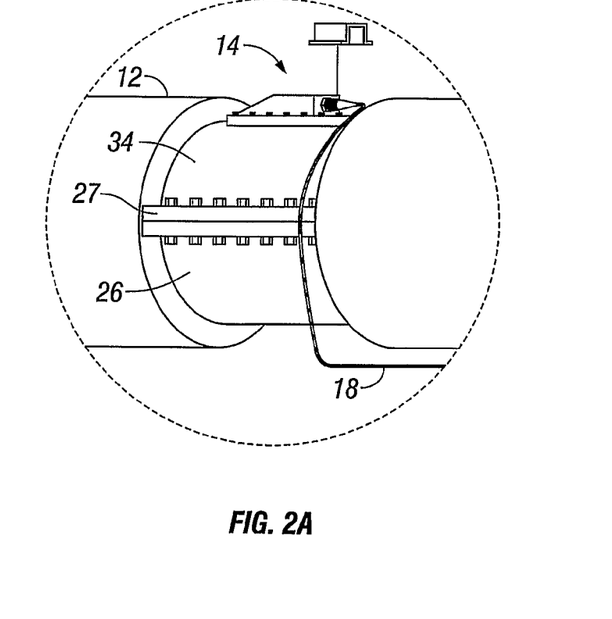
FIG. 2A is an enlarged, partially exploded, view of the fiber optic sensor assembly of FIG. 2.

Turning now to FIGS. 2 and 2A, a fiber optic sensing system 10 for use in a sub-sea pipeline 12 includes at least one fiber optic sensor assembly 14 ("sensor pad") coupled to the pipeline 12. The sensor pad 14 is coupled to remote equipment 16 by a sub-sea certified fiber optic cable 18 which runs outside of the pipeline 12. On-shore or above water, the cable 18 is coupled via splice box 20 to standard fiber optic cable 22 which is then coupled to the remote equipment 16. The remote equipment 16 may be configured to measure the temperature in the vicinity of the sensor pad 14 as well as the ambient sea temperature in the vicinity of the cable 18 connecting the equipment to the sensor pad. The temperature measurements can be transmitted to other systems to monitor the pipeline 12, to predict hydrate formation within the pipeline 12, to detect leaks in the pipeline 12, or other useful applications. Alternatively, or in addition to such temperature measurements, the remote equipment 16 may be configured to detect pressure or strain or vibrations or sound, and process such signals to detect leaks in the pipeline 12, and/or to detect the formation of hydrates within the pipeline 12, and/or other useful applications.

Figure 3:
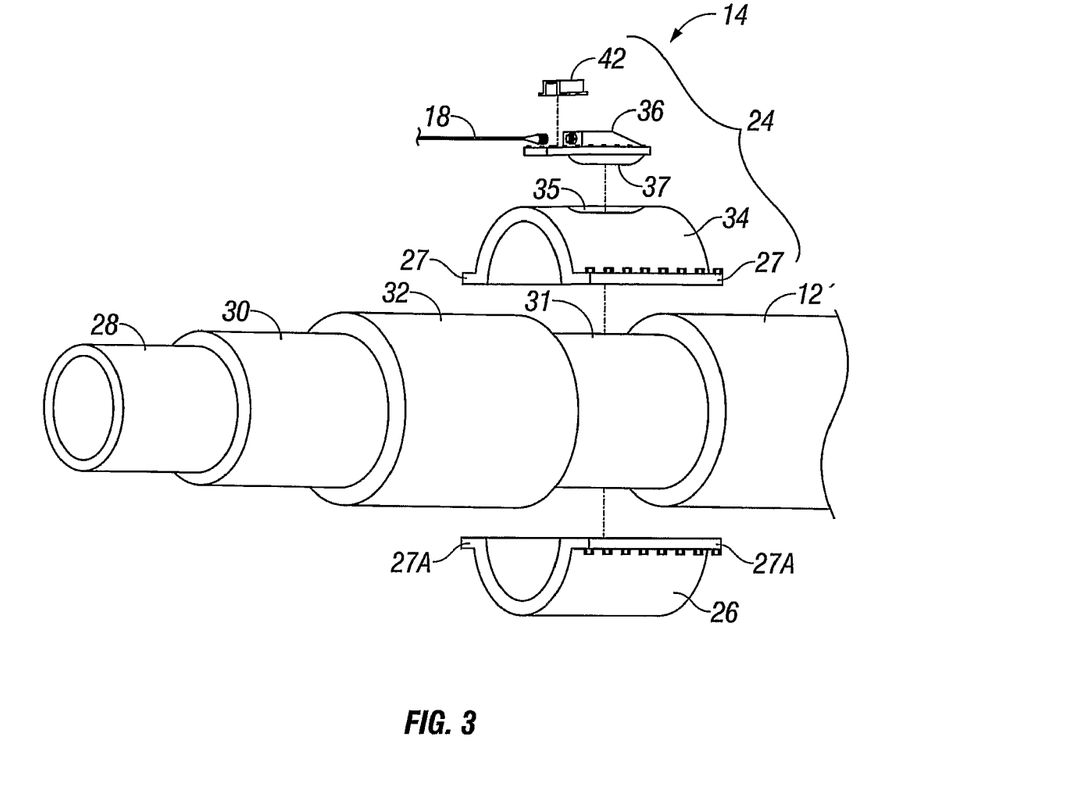
FIG. 3 is an exploded and partially cut away schematic view of the fiber optic sensor assembly and pipe section of FIGS. 2 and 2A in accordance with the present invention.
Figure 3A:
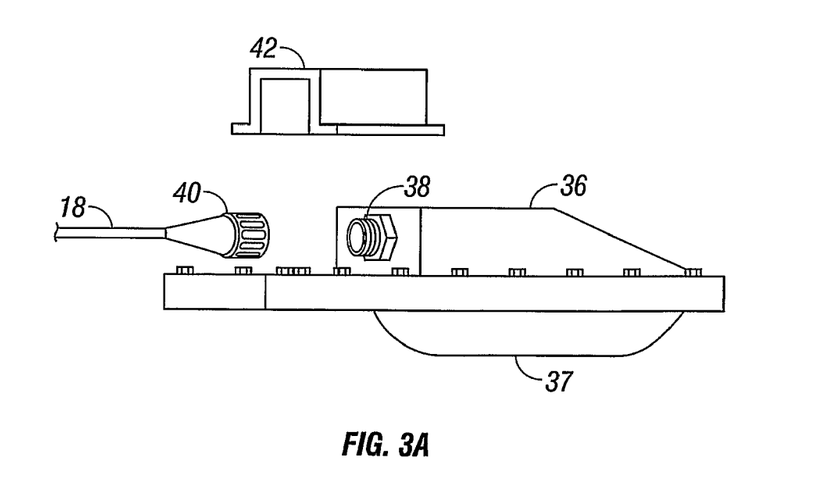
FIG. 3A is an enlarged, partially exploded, view of a portion of the fiber optic sensor assembly of FIG. 3.

Turning now to FIGS. 3 and 3A, the sensor pad 14 has two main parts 24, 26. The part 24 includes an upper clamp portion 34, a housing 36, and a cover 42. The upper clamp portion 34 is a semi-cylinder with oppositely arranged radial flanges 27. The part 26 is a semi-cylinder with oppositely arranged radial flanges 27A. The flanges 27 and 27A have a plurality of bolt holes which receive bolts so that the upper clamp portion 34 and the part 26 are clamped together about the pipeline 12 (FIG. 2A). The upper clamp portion 34 and part 26 are preferably made of glass reinforced nylon or a material with similar mechanical and thermal properties. Preferably a neoprene seal (not shown) is placed between the flanges 27, 27A before they are bolted together.

The pipeline 12 is made up of sections, each composed of an internal pipe 28 (which is preferably made of steel) that is wrapped in one or more layers of protective/insulating material. In the illustrative embodiment shown, the protective/insulating material includes an intermediate polypropylene layer 30 and an outer layer 32 of concrete. One or more sections 12' of the pipeline have a portion of the protective/insulating material removed or omitted to form an annular recess 31 in such pipeline section(s) as best shown in FIG. 3. The annular recess 31 provides an exposed area that is adapted to receive a sensor pad 14 that is attached thereto. In the illustrative embodiment shown, the annular recess 31 is formed by removing or omitting the outer layer 32 of concrete over a lengthwise segment of the pipeline section 12' and thus leaving the intermediate polypropylene layer 30 exposed over this lengthwise segment.

The upper clamp portion 34 of the sensor pad 14 supports the housing 36. The housing 36 is bolted to the upper clamp portion 34 before the sensor pad 14 is installed on the pipe. The housing 36 supports at least one externally-accessible connector 38 (FIG. 3A) which is optically coupled to a length of optical fiber 15 (FIGS. 7A-7D) disposed within the housing 36. The optical fiber 15 (or portions thereof) is preferably encapsulated in thermally conductive thermoset resin on the lower surface 37 of the housing 36. The lower surface 37 fits within a central cutout 35 in the upper clamp portion 34 such that when installed the lower surface 37 is positioned in close proximity to the exposed area of the pipeline section 12'. This configuration allows the optical fiber 15 (which is disposed in resin on or adjacent to this lower surface 37) to be positioned in close thermal contact with the exposed area of the pipeline section 12'. The thermoset resin should offer a very low coefficient of thermal expansion to prevent damage to the optical fiber due to seasonal variations in temperature and should also provide maximum thermal conductivity.

The connector 38 may be wet-mate or dry-mate. In either case, the fiber optic cable 18 is provided with the same kind of mating connector 40. Once the connectors 38 and 40 are connected, a protective cover 42 is mounted over them. The housing 36 and the bulkhead of the connector 38 are preferably made of identical metal to eliminate the risk of galvanic corrosion. A sealing ring (not shown) is preferably provided between the bulkhead of the connector 38 and the housing 36.

During installation, the housing 36 is bolted to the upper clamp portion 34 with a sealing ring (not shown) between them. The main part 24 (less the protective cover 42) and the main part 26 are positioned in the annular recess 31 of a selected pipeline section 12' and then clamped around the exposed area of the selected pipeline section 12'. Preferably, such operations are performed as the pipeline 12 is being deployed from a construction barge. If dry-mate connectors are used, the connector 40 is connected to the connector 38 and the protective cover 42 is installed prior to deploying the pipeline underwater from the barge. If wet-mate connectors are used, the connectors 38 and 40 are coupled and the protective cover 42 is installed by divers or an ROV after the pipeline is deployed.

Figure 4:
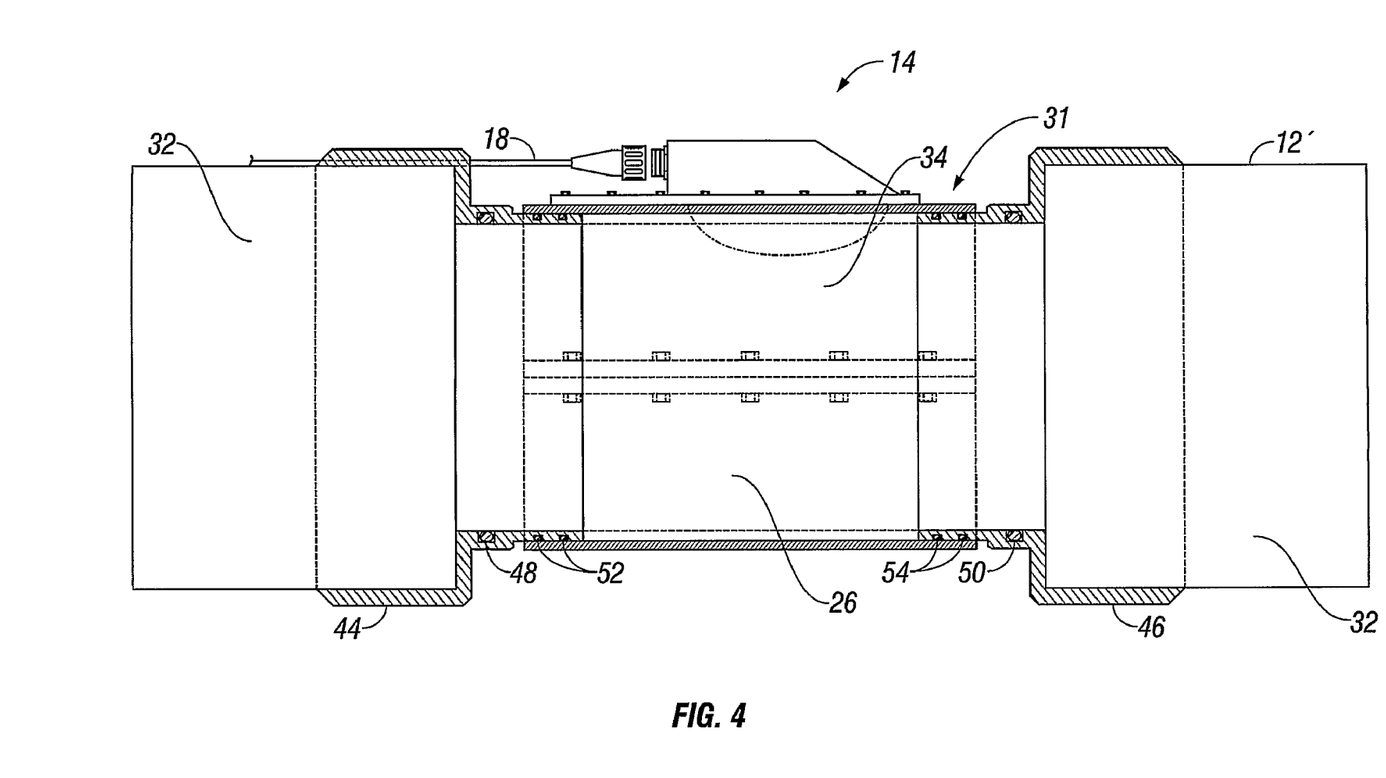
FIG. 4 is a side elevation view, in partial section, of the fiber optic sensor assembly of FIGS. 2 and 3 in accordance with the present invention.

Turning now to FIG. 4, prior to attaching the sensor pad 14 to the pipeline section 12', two shrouds 44, 46 are preferably installed on the pipeline section 12'. The shrouds 44, 46 cover the opposed edges of the annular recess 31 of the pipeline section 12'. The shrouds 44, 46 can be affixed to the opposed ends of the pipeline section 12' by adhesive or by mechanical fixation, such as an interference fit. The shrouds 44, 46 provide an environmental seal for the portions of the pipeline section 12' exposed at the edges of the annular recess 31, as well as an environmental seal between the exposed area of pipeline section 12' and the contact area of the sensor pad 14 as shown. A first set of toroidal sealing rings 48, 50 are installed between the respective shrouds and the exposed outer diameter surface that defines the recess 31. A second set of toroidal sealing rings 52, 54 are installed between the shrouds 44, 46 and the contact surfaces of the sensor pad 14. When assembled, the shrouds 44, 46 each present a cylinder having stepped inner and outer diameters. As illustrated, the shrouds 44, 46 each have an outer section and two inner sections. The outer section has an inner diameter that fits over the outer concrete layer 32 of the pipeline section 12'. One of the inner sections fits over the outer diameter surface of the recess 31 outside the contact area of the sensor pad 14. The other of the inner sections fits over the outer diameter surface of the recess 31 and under the contact area of the sensor pad 14. For alternate embodiments where the shrouds 44, 46 are not used, the first set of sealing rings 48, 50 can be omitted and the second set of sealing rings 52, 54 can be installed between the contact surfaces of the sensor pad 14 and the exposed outer diameter surface of the recess 31.

Preferably, the inside surfaces of the upper clamp portion 34 and the part 26 of the sensor pad 14 are lined with a thermal interface material, e.g. silicone pads used in the electronics industry for rapid conduction of heat away from sensitive devices. The use of such thermal interface material provides a thermal bridge between the sensor pad 14 and the exposed area of the pipeline section 12' and ensures even surface area contact in the event that there are surface imperfections in the exposed area of the pipeline section 12'. The thermal interface material preferably has a thickness in a range from 0.015 to 0.200 inches (0.38 to 5.08 mm). The thermal interface material can also aid in preventing seawater from contacting the portion of the pipeline section 12' that is covered by the clamp portion 34 and the part 26.

As described above, the sensor pad(s) 14 mounted on the section(s) 12' of the sub-sea pipeline 12 are coupled by fiber optic cables 18 to remote equipment 16. The remote equipment 16 can be located on-shore (FIG. 2) or on a platform. The remote equipment 16 preferably provides for distributed fiber optic temperature sensing measurements (FIG. 1) that provide an indication of the temperature in the vicinity of the sensor pad(s) 14 as well as at various locations along the fiber optic cable(s) 18 extending between the sensor pad(s) 14 and remote equipment 16 (and/or along fiber optic cables extending between sensor pads 14). Because such fiber optic cable(s) extend along the exterior of the sub-sea pipeline 12, the temperature measurements for the locations along the fiber optic cable(s) 18 provide for measurements of the ambient sea temperature along the fiber optic cable(s) 18. Alternatively, the remote equipment 16 can provide for fiber optic "point sensing" measurements that provide an indication of the temperature or pressure or strain in the vicinity of the sensor pad(s) 14. The measurements of the remote equipment 16 can be communicated to other systems for use in monitoring the sub-sea pipeline 12. Existing remote equipment, such as that sold by Schlumberger under the Sensa® name, can be used. Details of the operations of such remote equipment are described in U.S. Pat. No. 5,696,863, the complete disclosure of which is hereby incorporated by reference herein.

The temperature measurements of the remote equipment 16 can also be used to predict the formation of gas hydrates which can clog the pipeline 12. In organic chemistry, a hydrate is a compound formed by the addition of water. In the petroleum industry, a gas hydrate is a water lattice (ice) in which hydrocarbon molecules are embedded. A gas hydrate can be formed when a stream of gas is cooled to below a dew point temperature in the presence of water. If a gas hydrate should form in the pipeline 12, it will likely agglomerate, stick to the interior wall of the pipe, and block the flow of petroleum. The process of clearing a hydrate plugged pipeline is expensive and time consuming. It will also be noted that until the pipeline is cleared, petroleum is not being transported. Since the locations in the pipeline 12 where gas hydrates are likely to form are known, the present invention proposes placing sensor pads 14 at each of these locations. In the preferred embodiment, the sensor pads 14 employ a long length of optical fiber 15 (for example, on the order of 10 meters in length or more) within the housing 36. The long length of optical fiber provides for a "spot" temperature measurement when used in conjunction with fiber optic distributed temperature sensing equipment. Such temperature measurements can be used to predict the formation of gas hydrates in the pipeline as is known in the art. For example, see U.S. Patent Application Publication 2005/0283276 and U.S. Patent Publication 2005/0139138, herein incorporated by reference in their entireties. Alternatively, or in addition to such measurements, the remote equipment 16 may be configured to detect pipeline leaks through the detection of vibrations or bubbles using known fiber optic noise detection techniques.

Figure 5:
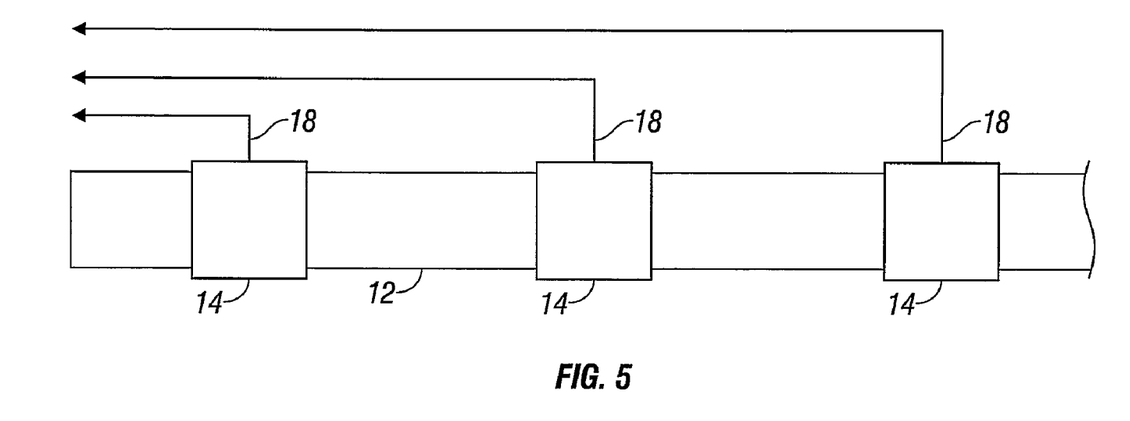
FIG. 5 is a schematic diagram illustrating one arrangement utilizing a plurality of fiber optic sensor assemblies in accordance with the present invention.
Figure 6:
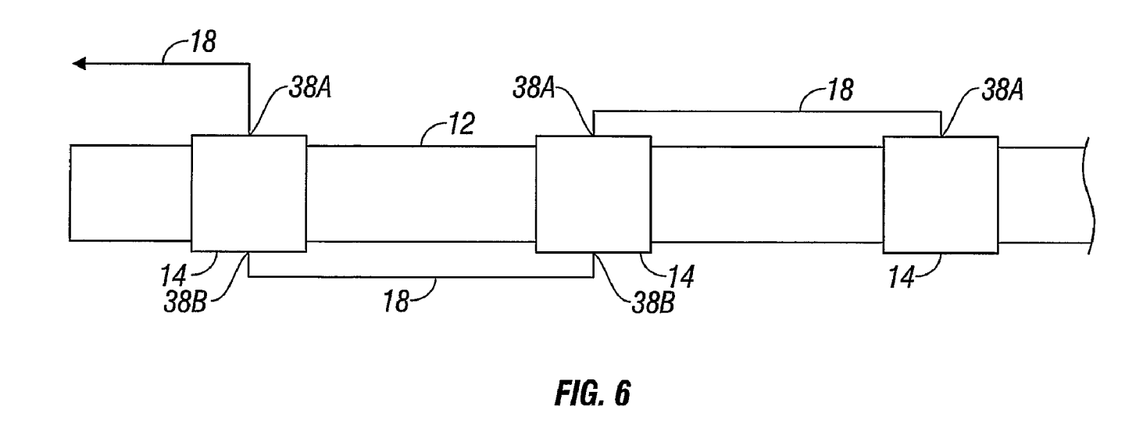
FIG. 6 is a schematic illustration of an alternate arrangement utilizing a plurality of fiber optic sensor assemblies in accordance with the present invention.

FIGS. 5 and 6 illustrate schematically two different arrangements that use a plurality of sensor pads 14 as described herein. In the arrangement of FIG. 5, each sensor pad 14 is coupled by its own cable 18 to the remote equipment 16. In the in-line arrangement of FIG. 6, two of the sensor pads 14 are provided with two connectors 38A, 38B (one at each end of the optical fiber disposed within its housing) and the sensor pads 14 are coupled in series with each other using cables 18.

FIGS. 7A-7D are schematic diagrams illustrating exemplary configurations for the length of optical fiber 15 housed in the sensor pad 14 of the present invention.

Figure 7A:
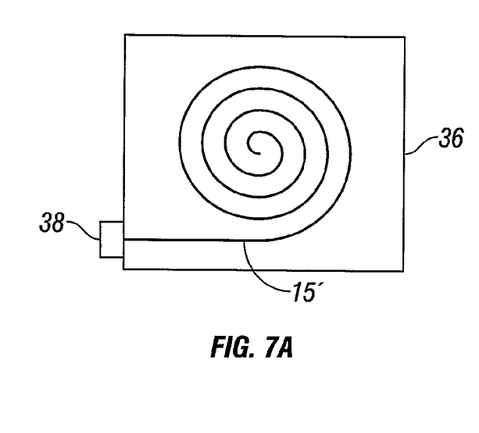

In FIG. 7A, the optical fiber 15' is a long length of optical fiber which is preferably wrapped around itself in a coiled manner. The optical fiber 15' is preferably at least 10 meters in length and can be up to 1000 meters in length. The configuration of FIG. 7A is suitable for a "spot" temperature measurement when used in conjunction with fiber optic distributed temperature sensing equipment. The configuration of FIG. 7A can be used for hydrate formation prediction as described above.

Figure 7B:
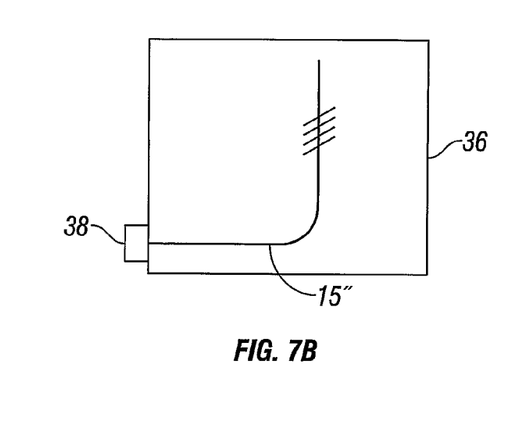

In FIG. 7B, the optical fiber 15" includes a Bragg grating etched therein. The configuration of FIG. 7B is suitable for "point sensing" as part of a fiber optic point sensing system.

Figure 7C:
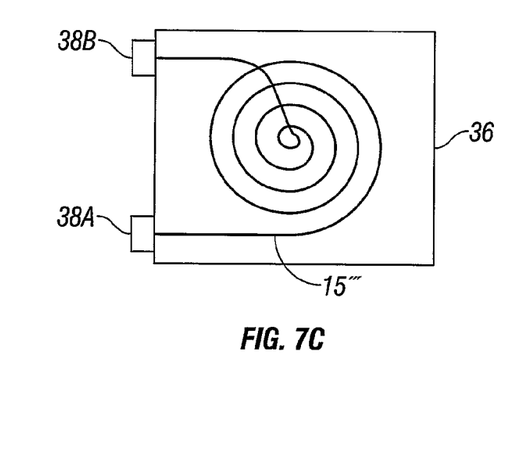

In FIG. 7C, the optical fiber 15''' is a long length of optical fiber which is preferably wrapped around itself in a coiled manner. The ends of the long length of optical fiber 15''' are terminated at connectors 38A, 38B supported by the housing 36. The optical fiber 15''' is preferably at least 10 meters in length and can be up to 1000 meters in length. The configuration of FIG. 7C is suitable for in-line "spot" temperature sensing as part of a fiber optic distributed temperature sensing system.

Figure 7D:
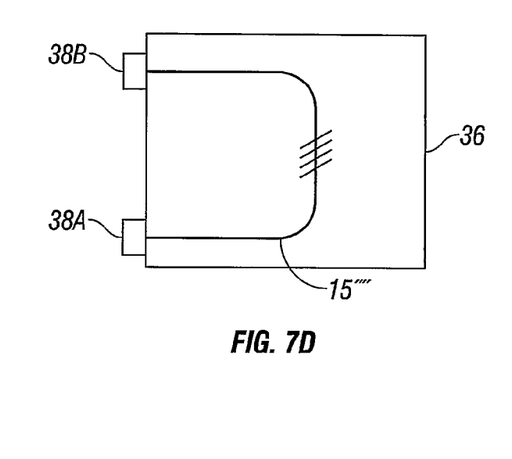

In FIG. 7D, the optical fiber 15'''' includes a Bragg grating etched therein. The ends of the optical fiber 15'''' are terminated at connectors 38A, 38B supported by the housing 36. The configuration of FIG. 7D is suitable for "multi-point sensing" as part of a fiber optic multi-point sensing system.

There have been described and illustrated herein a fiber optic sensing apparatus for use on sub-sea pipelines, methods for deploying the apparatus, and methods for using same. While particular embodiments of the invention have been described, it is not intended that the invention be limited thereto, as it is intended that the invention be as broad in scope as the art will allow and that the specification be read likewise. Thus, while a particular shape and configuration has been disclosed for the housing of the sensor pad, it will be appreciated that other shapes and configurations can be used as well. For example, and not by way of limitation, the housing can be integrally formed as part of the upper clamping member of the sensor pad. In another alternative embodiment, the lower clamping member can be replaced by a clamping member that supports a second sensor housing in a manner similar to the upper clamping member. In this configuration, two sensing fibers can be housed on opposite sides of the given pipeline section. In yet another alternative embodiment, a layer of insulation material can be applied between the exterior surface of the pipeline section and the contact area of the sensor pad. The addition of such insulation material can permit the fiber optic temperature sensing system to measure both the temperature of the pipeline and the effects of degradation in efficiency of insulation along the pipeline. It will therefore be appreciated by those skilled in the art that yet other modifications could be made to the provided invention without deviating from its scope as claimed.

What is claimed is:

1. An apparatus for use on a pipeline, comprising:
two semi-cylindrical halves removably coupled to each other; and
a housing supported on one of said two semi-cylindrical halves, the housing having a length of optical fiber disposed therein, and the housing supporting at least one externally-accessible fiber optic connector that is operably coupled to the optical fiber disposed within the housing.

2. An apparatus according to claim 1, wherein:
said optical fiber is encapsulated in thermally conductive thermoset resin.

3. An apparatus according to claim 1, wherein:
said housing is removably coupled to the one of said two semi-cylindrical halves.

4. An apparatus according to claim 1, wherein:
the housing is an integral part of the one of said two semi-cylindrical halves.

5. An apparatus according to claim 1, wherein:
the two semi-cylindrical halves each have opposing flanges, the flanges providing holes for mechanical connection of the two semi-cylindrical halves.

6. An apparatus according to claim 1, further comprising:
a protective cover covering said fiber optic connector.

7. An apparatus according to claim 1, wherein:
the one semi-cylindrical half that supports the housing includes a central cut-out for receiving a portion of the housing.

8. An apparatus according to claim 1, wherein:
said two semi-cylindrical halves are composed of glass reinforced nylon.

9. An apparatus according to claim 1, wherein:
the length of optical fiber is long to provide for spot temperature measurements as part of a fiber optic distributed temperature measurement system.

10. An apparatus according to claim 9, wherein:
the length of optical fiber is arranged in a coiled manner.

11. An apparatus according to claim 1, wherein:
the length of optical fiber includes a Bragg grating embedded therein to provide for measurements of temperature as part of a fiber optic point sensing system.

12. An apparatus according to claim 1, wherein:
said housing supports two fiber optic connectors that are operably coupled to opposite ends of the length of optical fiber disposed within the housing.

13. An apparatus according to claim 1, wherein:
the at least one fiber optic connector comprises one of a wet-mate type connector and a dry-mate type connector.

14. An apparatus for use in a pipeline, comprising:
a pipe section having an internal conduit and at least one layer that surrounds the internal conduit, the at least one layer providing for protection and insulation of the internal conduit, wherein a segment of the pipe section has a portion of the at least one layer removed or omitted to define an annular recess; and
a sensor device having two semi-cylindrical halves that are coupled together and disposed within the annular recess, the semi-cylindrical halves surrounding the segment of the pipe section, and the sensor device housing a length of optical fiber that is operably coupled to at least one externally-accessible fiber optic connector.

15. An apparatus according to claim 14, wherein:
the portion of the at least one layer that is removed or omitted comprises an exterior cement layer.

16. An apparatus according to claim 15, wherein:
the at least one layer comprises an intermediate layer of polypropylene which is exposed along the segment of the pipe section.

17. An apparatus according to claim 14, further comprising:
a protective cover for the at least one fiber optic connector.

18. An apparatus according to claim 14, wherein:
said optical fiber is encapsulated in thermally conductive thermoset resin.

19. An apparatus according to claim 14, wherein:
said semi-cylindrical halves are composed of glass reinforced nylon.

20. An apparatus according to claim 14, further comprising:
a pair of shrouds, each extending over the pipe section outside the annular recess and extending over a portion of the exposed area of the segment within the annular recess and under the sensor device.

21. An apparatus according to claim 20, further comprising:
a first set of toroidal seals that are disposed within the annular recess between a respective shroud and the exposed area of the segment of the pipe section.

22. An apparatus according to claim 20, further comprising:
a second set of toroidal seals that are disposed within the annular recess between a respective shroud and the sensor device.

23. An apparatus according to claim 14, wherein:
the pipe section is part of a sub-sea pipeline having at least one sub-sea fiber optic cable that extends along the exterior of the sub-sea pipeline, the at least one fiber optic cable has a connector that mates to the connector of the sensor device, and the at least one fiber optic cable is operably coupled to remote equipment.

24. An apparatus according to claim 23, wherein:
the remote equipment includes means for fiber optic distributed temperature sensing that provides for temperature measurements at locations over the at least one fiber optic cable and at the optical fiber housed within the sensor device.

25. An apparatus according to claim 24, wherein:
the length of optical fiber housed by the sensor device is at least 10 meters to provide for spot temperature measurements at the sensor device.

26. An apparatus according to claim 23, wherein:
the remote equipment includes means for fiber optic temperature sensing that provides for temperature measurements at the optical fiber housed within the sensor device.

27. An apparatus according to claim 26, wherein:
the optical fiber housed within the sensor device has a Bragg grating etched therein.

28. An apparatus according to claim 14, wherein:
the optical fiber housed within the sensor device has an end reflector disposed at one end of the optical fiber.

29. An apparatus according to claim 14, wherein:
opposite ends of the optical fiber housed within the sensor device are coupled to two externally-accessible connectors of the sensor device.

30. A method of deploying fiber optic sensing on a sub-sea pipeline, said method comprising:
providing at least one pipe section having an internal conduit and at least one layer that surrounds the internal conduit, the at least one layer providing for protection and insulation of the internal conduit, wherein a segment of the pipe section has a portion of the at least one layer removed or omitted to define an annular recess;
providing at least one sensor device having two semi-cylindrical halves that are coupled together, the sensor device housing a length of optical fiber that is operably coupled to at least one externally-accessible fiber optic connector; and
placing the semi-cylindrical parts within the annular recess and coupling the semi-cylindrical parts to each other such that the semi-cylindrical parts surround the segment of the pipe section.

31. The method according to claim 30, further comprising:
deploying the pipe section with the sensor device affixed thereto as part of the sub-sea pipeline.

32. The method according to claim 31, further comprising:
extending at least one sub-sea fiber optic cable along the exterior of the sub-sea pipeline, the at least one fiber optic cable having a connector that mates to the connector of the sensor device.

33. The method according to claim 32, wherein:
connection between the connector of the fiber optic cable and the connector of the sensor device is made underwater.

34. The method according to claim 32, further comprising:
coupling the at least one fiber optic cable to remote equipment.

35. A method of fiber optic sensing on a sub-sea pipeline, said method comprising:
providing at least one pipe section as part of the sub-sea pipeline, the pipe section having an internal conduit and at least one layer that surrounds the internal conduit, the at least one layer providing for protection and insulation of the internal conduit, wherein a segment of the pipe section has a portion of the at least one layer removed or omitted to define an annular recess;
providing at least one sensor device having two semi-cylindrical halves that are coupled together and disposed within the annular recess, the semi-cylindrical halves surrounding the segment of the pipe section, and the sensor device housing a length of optical fiber that is operably coupled to at least one externally-accessible fiber optic connector; and
providing at least one sub-sea fiber optic cable that extends along the exterior of the sub-sea pipeline, the at least one fiber optic cable having a connector that mates to the connector of the sensor device, and the fiber optic cable coupled cable to remote equipment.

36. A method according to claim 35, wherein:
the remote equipment includes means for fiber optic distributed temperature sensing that provides for temperature measurements at locations along the at least one fiber optic cable and at the optical fiber housed within the sensor device.

37. An method according to claim 35, wherein:
the remote equipment includes means for fiber optic temperature sensing that provides for temperature measurements at the optical fiber housed within the sensor device.

* * * * *